June 24, 1941. D. F. ALEXANDER ET AL Re. 21,837

REFRIGERATING APPARATUS

Original Filed March 4, 1937 3 Sheets-Sheet 1

INVENTORS
D. F. Alexander, C. F. Kenney,
BY C. L. Paulus,
Spencer Hardman & Fehr
ATTORNEYS June 24. 1941. D. F. ALEXANDER ET AL. Re. 21,837

REFRIGERATING APPARATUS

Original Filed March 4, 1937 3 Sheets-Sheet 2

D. F. Alexander, C. F. Kinney & C. L. Paulus, INVENTORS

BY Spencer, Hardman & Fehr ATTORNEYS

June 24, 1941. D. F. ALEXANDER ET AL Re. 21,837

REFRIGERATING APPARATUS

Original Filed March 4, 1937 3 Sheets-Sheet 3

INVENTORS
D. F. Alexander, R. T. Kenney,
BY C. L. Paulus,
Spencer Hardman & Fehr
ATTORNEYS Reissued June 24, 1941

Re. 21,837

UNITED STATES PATENT OFFICE 21,837

REFRIGERATING APPARATUS

Donald F. Alexander, Charles F. Henney and Charles L. Paulus, Dayton, Ohio, assignors to General Motors Corporation, Dayton, Ohio, a corporation of Delaware Original No. 2,104,382, dated January 4, 1938, Serial No. 129,024, March 4, 1937. Renewed September 16, 1937. Application for reissue June 29, 1938, Serial No. 216,630

30 Claims. (Cl. 62—117)

This invention relates to refrigeration, and more particularly to the conditioning of air in railway cars or the like. This application is a continuation in part of our copending application Serial No. 118,816, filed January 2, 1937.

In our copending application, we have disclosed the conditioning of air by a refrigerant which is circulated by a compressor and in which a motor-generator and the compressor are driven from the live axle assembly of the car. The motor-generator, as a motor, drives the compressor, when refrigeration is required at a first low car speed zone. During a second car speed zone, the live axle assembly drives the compressor and may also drive the motor-generator, to produce refrigeration when required and, if desired, to generate and charge the battery when refrigeration is not required. During a third and highest car speed zone, the live axle assembly drives the motor-generator, as a generator, to charge the battery and also drives the compressor if refrigeration is required in such a manner that both the compressor and motor-generator may be driven at the same time. Reference is hereby made to the said copending application Serial No. 118,816 for further disclosure thereof.

The foregoing system is particularly advantageous where the car is hauled by any type of locomotive, such as a steam locomotive, since the entire system is a unitary structure within the car and is independent of the type of locomotive. Occasionally, however, a car may be hauled during a part of a run by a steam locomotive, and during another part of the run it may be hauled by a locomotive or car which is electrically energized either from an overhead wire system or by electrical power derived from an internal combustion engine and generator on the locomotive. The present invention permits a portion of the air conditioning system and/or the battery charging system to be directly connected to the outside source of electrical energy which drives the locomotive or car and thus removes a certain amount of tractive load from the wheels of the car. This is particularly desirable because the tractive power of electric locomotives or cars falls off rapidly at high speeds and it is desirable to reduce the tractive load therefrom. This improvement is also adapted for use when outside electrical energy is available only at the station, as for "stand by" service.

In the one modification of our invention, a separate motor-generator unit or similar current rectifying or voltage reducing device automatically is started whenever the outside or tractive electrical source of power is available, and this additional motor-generator or device not only charges the battery of the car, but also furnishes power to drive the original motor-generator disclosed in our copending application so that it acts as a motor to drive the compressor as long as the outside or tractive electrical source of power is available.

In another modification an additional motor is provided which drives the compressor while the outside or tractive electrical source of power is available. If desired the original motor-generator disclosed in our copending application may be driven by the additional motor or it may be driven from the live axle assembly.

Further objects and advantages of the present invention will be apparent from the following description, reference being had to the accompanying drawings, wherein a preferred form of the present invention is clearly shown.

Figure 1:
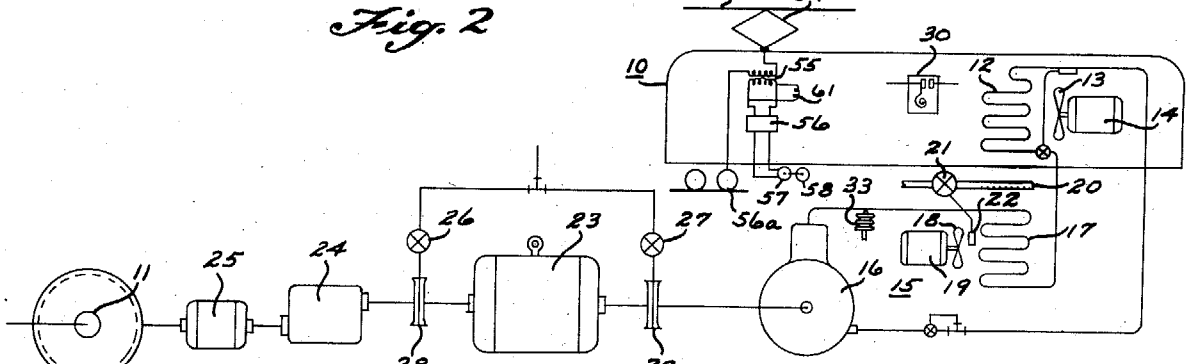
Fig. 1 is a diagrammatic representation of an air conditioning system as applied to a railway car in which a current rectifying or voltage modifying device is provided.

Referring to Fig. 1, a railway car 10 is provided with a live axle assembly 11 which may include one or more axles of the car. The car 10 is provided with a compartment to be cooled. For this purpose, an evaporator 12 is provided over which a current of air is blown by means of a fan 13 driven by a motor 14. The refrigerant for the evaporator 12 is circulated or liquefied by the refrigerant circulating or liquefying unit 15 preferably comprising a compressor 16 and condenser 17. Air is blown over the condenser 17 by means of the fan 18 driven by the motor 19.

On abnormally warm days, water is sprayed over the condenser 17 by means of the spray device 20 under the control of the valve 21 which is actuated by the thermostatic bulb 22. Water for the spray device 20 is provided by a tank under pneumatic pressure derived from the air-brake system of the car.

Figure 2:
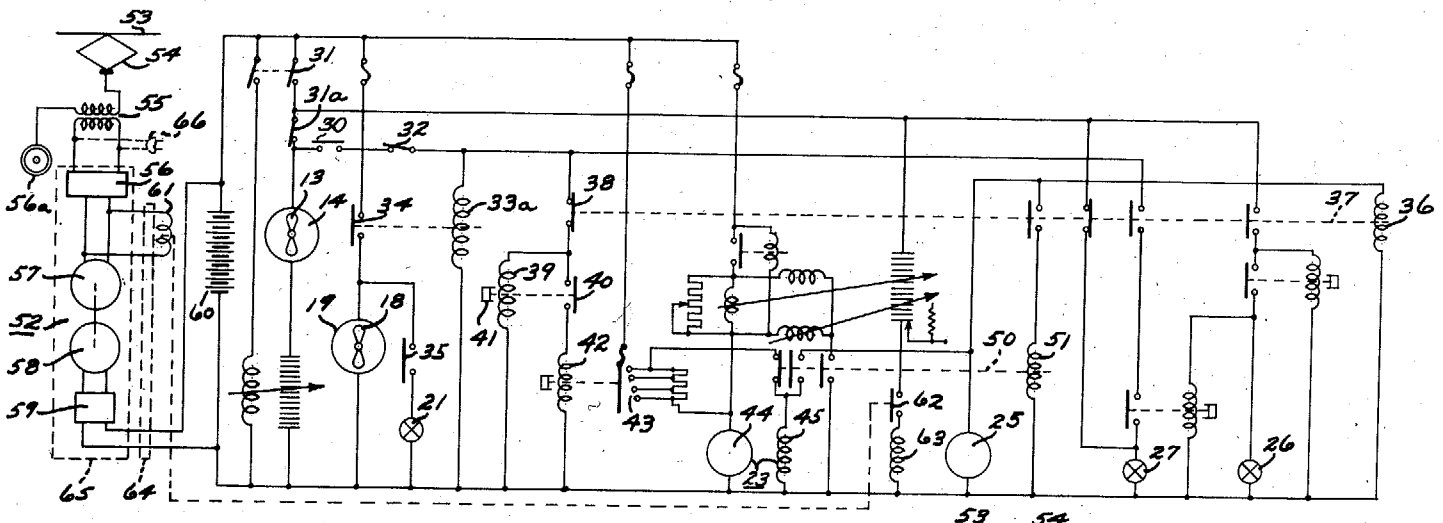
Fig. 2 is a diagrammatic representation of the wiring system for the apparatus shown in Fig. 1, together with the necessary cooperating parts disclosed in our copending application.

*Operation of system of Figs. 1 and 2 when outside electrical energy is not available*

The arrangement is such that the live axle assembly 11 drives the compressor 16 together with a motor-generator 23. Preferably an automatic variable ratio transmission 24 is provided which automatically delivers a substantially constant drive speed to the compressor and motor-generator after the car has attained a predetermined speed limit. If desired, an exciter 25 is driven proportionally to the car speed, and this exciter is used not only to excite generating field of the motor-generator but also to control the devices which are responsive to car speed, such as the pneumatic valves 26 and 27 which control the clutches 28 and 29.

The refrigerating output of the system is controlled by an automatic switch 30 which may be made responsive to any condition of air such as the dry bulb temperature, wet bulb temperature, relative humidity or the like either within the car or outside the car or both.

Fig. 2 shows the wiring diagram for the system. When air conditioning is desired, the switches 31 and 31*a* are manually closed and start the motor 14 which drives the fan 13. During a first car speed zone, such as when the car is standing or is moving at a relatively low speed, such as below 15 M. P. H. the motor-generator 23, as a motor, drives the compressor 16 if refrigeration is required under the control of switch 30. The switch 32 is normally closed since it is opened only in case of abnormal head pressure by the bellows 33. The switch 32 being closed the solenoid 33*a* closes switch 34 and starts the motor 19 which actuates the condenser fan 18. If it is abnormally warm, thermostatic bulb 22 closes the switch 35 which opens the valve 21 and sprays water over the condenser. The exciter 25 does not have a sufficient voltage to cause the solenoid 36 to actuate the arm 37 and hence the switch 38 is closed. This energizes the solenoid 39 which closes the switch 40 with a time delay device 41. The closing of switch 40 energizes solenoid 42 which in turn sequentially closes the contacts 43 and places the armature 44 of motor-generator 23 across the battery. The motor field 45 is simultaneously placed across the battery. Before the motor-generator can be started, the solenoid valve 27 is energized and closes the clutch 29 so that the motor-generator does not start as a motor without a load but is connected to the compressor.

At the next car speed zone, which may be between 15 and 30 M. P. H., the voltage of the exciter is sufficient to energize solenoid 36 enough to move the contact arm 37 to the right. This movement so arranges the parts that the live axle assembly 11 can drive the compressor 16, if refrigeration is required, but the motor-generator 23 is prevented from generating, as more fully explained in our copending application. At the third, or highest, car speed zone the voltage of the exciter is sufficiently high to actuate the contact arm 50 by means of the solenoid 51, and this changes the motor-generator into a generator the field 45 being energized by the exciter 24. The arrangement is such that the compressor is driven from the live axle assembly when refrigeration is required, and the motor-generator is driven as a generator at all times during this highest car speed.

The foregoing operation is more fully described in our copending application and reference is made thereto, if necessary, for a more detailed description thereof.

*Operation of system of Figs. 1 and 2 when outside electrical energy is available*

In accordance with the modification shown in Figs. 1 and 2 of this application, when outside electrical energy is available, an electrical energy rectifying or voltage reducing unit 52 is automatically connected into the system so that the battery is charged by the unit 52 and the motor-generator 23 acts only as a motor to drive the compressor when refrigeration is required. For example, when the train arrives at that portion of the line where an overhead wire system 53 is provided the connector 54 is elevated into position. The primary of the transformer 55 is connected to the ground or axle 56*a* and the wire 53 to induce relatively low tension A. C. current in the secondary coil. This latter current passes through an A. C. motor starter 56 and drives the A. C. motor 57 of the unit 52. The motor 57 drives the low voltage generator 58 which is connected, through the automatic battery cut-out 59, to both sides of the battery 60. The battery cut-out 59 automatically connects the generator 58 with the battery when the generator 58 operates and disconnects it when it is idle. Current or power is thus provided for charging the battery 60 and is made available to drive the compressor through motor-generator 23 as a motor under the control of switch 30 as previously described. When the connector 54 is elevated the solenoid 61 is energized and opens the switch 62. This opens the circuit to the exciter field 63 and prevents the exciter 25 from generating any current thus placing the wiring diagram in the equivalent position of zero car speed. Under these conditions, motor-generator 23 drives the compressor 16, under the control of automatic switch 30, at all car speeds and the motor-generator 23 is rendered incapable of acting as a generator.

While we have shown the terminals 54 and 56*a* specifically connected to an overhead wire and to a rail, these may be connected to any other source of outside electrical energy, such as an electrical source on a Diesel engine-generator type of locomotive, or a source of electrical energy at a station.

If desired, the vehicle may be constructed to cooperate with a motor-generator truck at the station. In this case, the vehicle is provided with the solenoid 61 which is connected to outlets to cooperate with the connector plug 64 which is connected by cable structure to the motor-generator truck 65 in such a manner that the plug 64 can be connected to terminals on the vehicle to complete the circuits shown. In such a case, the transformer 55 and connections 54 and 56*a* are omitted, and, in lieu thereof, a connector plug 66 is carried by the truck 65 so that the plug 66 may be connected to power terminals (A. C. current) at the station and the plug 64 is connected to the vehicle. Such truck can service one or more cars at the station by being provided with one or more plugs 64. The truck 65 carries the motor-generator 52 and is wheeled alongside the train or car while it stands at the station or other place.

Where the truck 65 and plugs 64 and 66 are not used, the motor-generator 52 and all its connections, except wire 53, are carried on the vehicle.

Figures 3, 4:
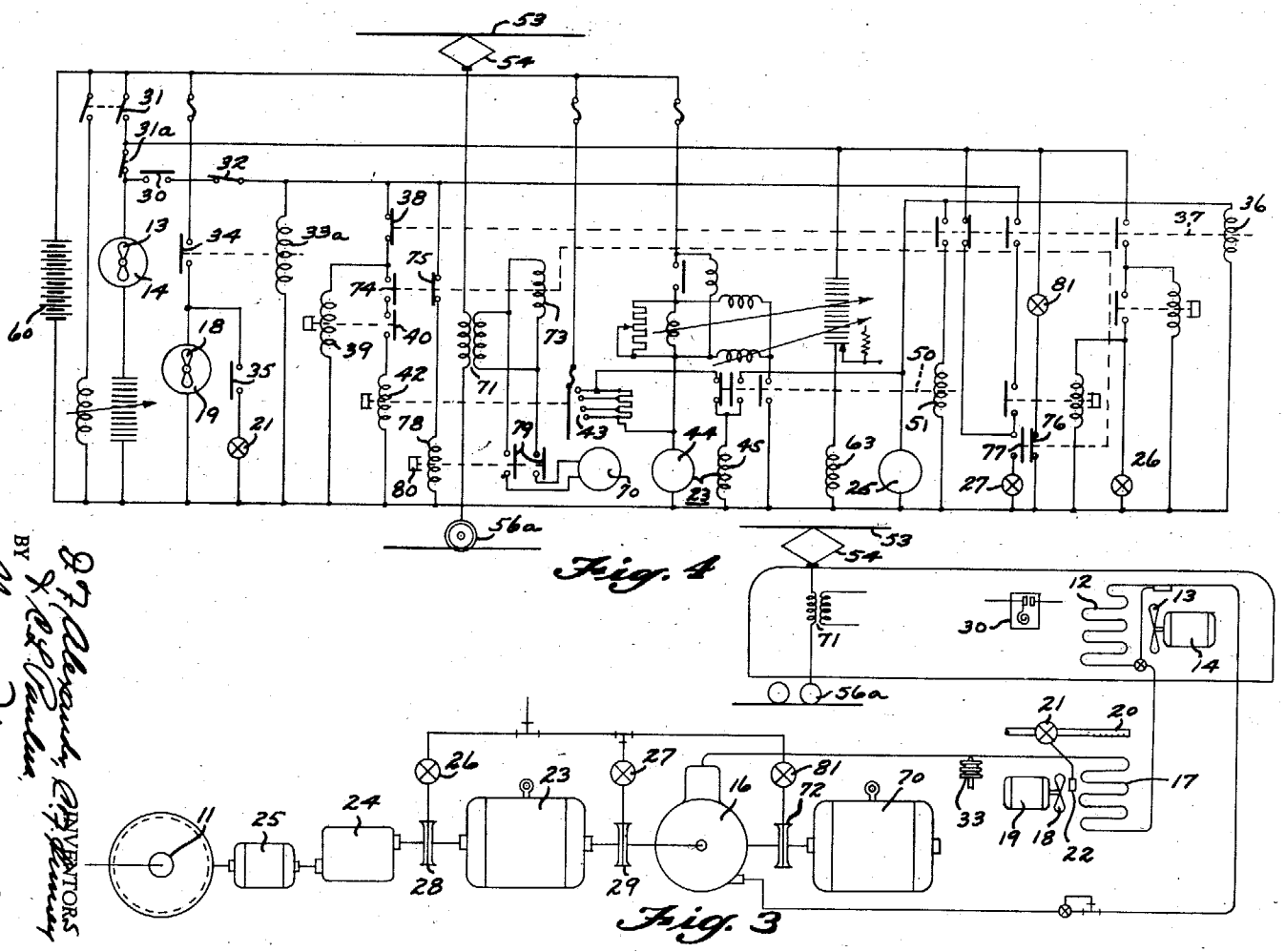
Fig. 3 is a diagrammatic representation, somewhat similar to Fig. 1, but showing a modification in which an additional motor is provided to be energized from the outside source of power and to drive the compressor.
Fig. 4 is a diagrammatic representation of the wiring system of the apparatus shown in Fig. 3.

*Operation of system of Figs. 3 and 4 when outside electrical energy is not available*

The operation of the system shown in Figs. 3 and 4 when outside electrical energy is not available is substantially the same as that heretofore described with respect to Figs. 1 and 2. Corresponding parts have been similarly numbered in Figs. 3 and 4 therefore and the description heretofore given with respect to those parts in Figs. 1 and 2 is applicable with respect to similar parts in Figs. 3 and 4.

*Operation of system of Figs. 3 and 4 when outside electrical energy is available*

In the modification shown in Figs. 3 and 4 a motor 70 is provided which may be energized from the source of outside electrical energy, and this motor is connected to the compressor, and the motor-generator 23 is disconnected from the compressor and driven from the live axle assembly to charge the battery independently of the compressor.

The source of outside electrical energy may comprise the overhead wire 53 and wheel 56. The primary coil of the transformer 71 is energized when the connector 54 is connected to the wire 53. The secondary coil of the transformer 71 is then in readiness to supply current of reduced voltage to the motor 70. The motor 70 is provided with a pneumatic clutch 72 which may be automatically clutched between the motor 70 and the compressor 16 when the source of outside electrical energy is available and when refrigeration is required.

Automatic means are provided for automatically changing the operation of the system when the source of outside electric energy is connected thereto. This is accomplished by providing a solenoid 73 which is automatically energized whenever the connector 54 is connected to the wire 53. The solenoid 73, when energized, shifts the switches 74, 75, 76 and 77 to change the operation of the system. The opening of the switch 74 prevents the motor-generator 23 from being energized, as a motor, from the battery. The closing of the switch 75 places the motor 70 under the control of the thermostatic switch 30. When the switch 30 closes, in response to refrigeration demand, battery current is supplied to the solenoid 78. This closes the switches 79, with a time delay caused by pneumatic device 80, and closes the circuit between the transformer 71 and motor 70 to start the same. Before the switches 79 can close, however, the switches 76 and 77 have been shifted, since they have no time delay to disconnect the compressor at clutch 29 and connect it to the motor 70 at clutch 72. The closing of the switch 76 energizes the valve 81 which controls the flow of air to the clutch 72 and automatically clutches the same. At the same time the opening of the switch 77 prevents the actuation of the valve 27 and thus disconnects the motor-generator unit 23 from the compressor 16 at clutch 29 and thus leaves the motor-generator 23 to be driven from the live axle assembly 11 so that it can charge the battery whenever speed conditions of the car are sufficiently high.

Figures 5, 6:
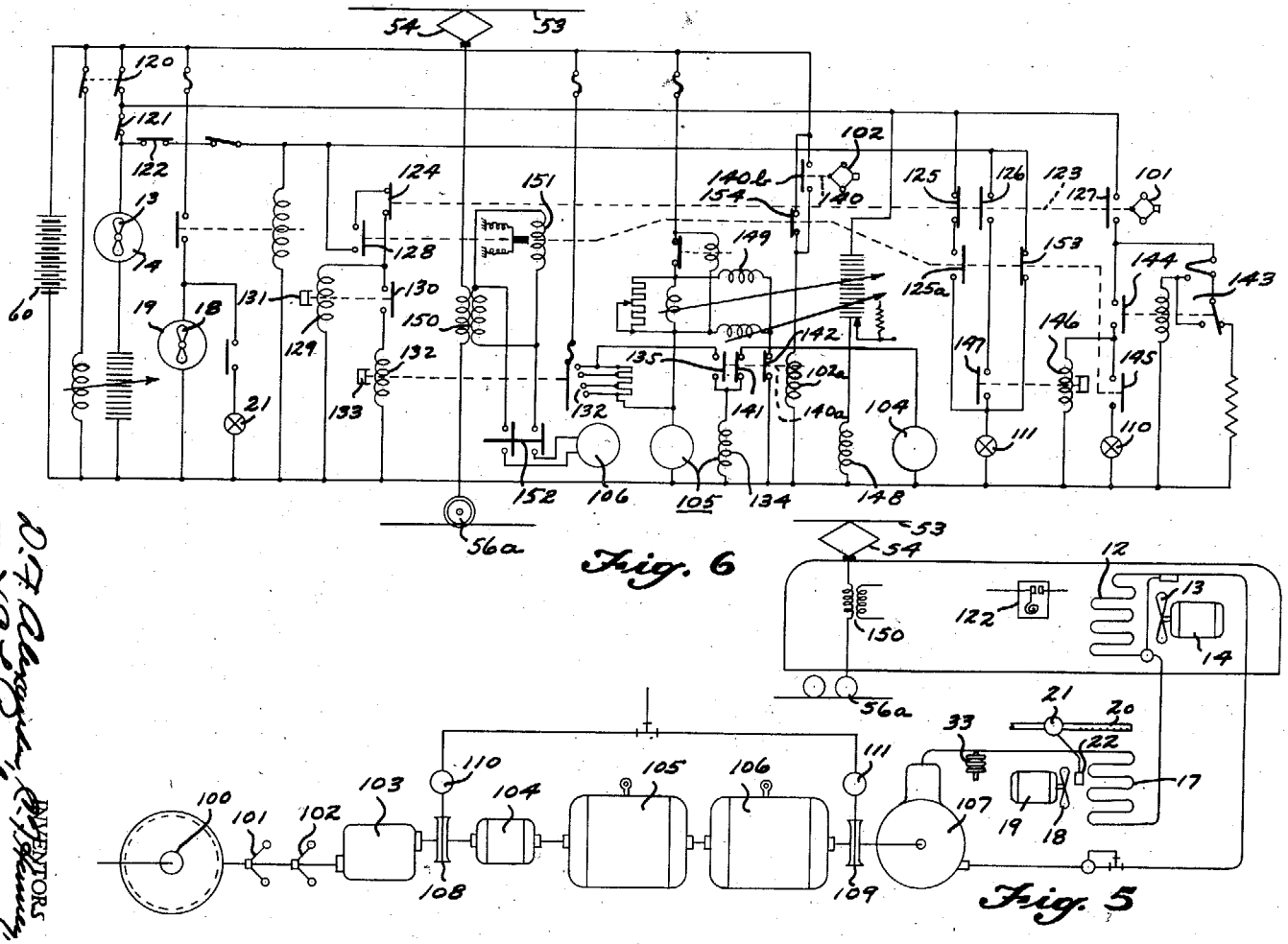
Fig. 5 is a view, somewhat similar to Fig. 3, but showing a slightly different type of arrangement in which the additional motor drives both the compressor and the original motor-generator.
Fig. 6 is a diagrammatic representation of the wiring system for the apparatus of Fig. 5.

*Operation of system of Figs. 5 and 6 when outside electrical energy is not available*

In this system, an additional motor drives the motor-generator and compressor when outside electrical energy is available. While such energy is not available the control of the various parts in response to car speed is substantially the same as previously described, but is accomplished by centrifugal switches rather than by the varying voltage of the exciter. Thus the live axle 100 drives the centrifugal switches 101 and 102 and also the variable ratio transmission 103 which in turn drives the exciter 104, motor-generator 105, additional motor 106 and compressor 107 at substantially constant speed after the car has attained a predetermined relatively low speed. Clutches 108 and 109 are provided and are controlled by pneumatic valves 110 and 111. The arrangement is such that the motor-generator 105, as a motor, drives the compressor 107 during a first car speed zone which may be from zero to 15 M. P. H. During a second car speed zone, which may be from 15 to 30 M. P. H., the live axle assembly 100 drives the motor-generator 105 at all times, and the compressor 107 whenever refrigeration conditions require it. If the compressor 107 is being driven, the motor-generator is prevented from generating; but if the compressor 107 is idle, then the motor-generator is caused to generate and charge the battery. During the third or highest car speed zone, such as all speeds above 30 M. P. H., the live axle assembly drives the motor-generator 105 at all times, and the compressor 107 whenever refrigeration conditions require it. The additional motor 106 is connected in the drive mechanism to be permanently connected to the motor-generator 105 in such a manner that it idles whenever the motor-generator runs as long as the source of outside electrical energy is not available.

The wiring diagram in Fig. 6 corresponds with a corresponding disclosure in applicants' copending application except with respect to the parts which are added for use with the source of outside electrical energy, and reference is made to said application, if necessary, for a more detailed description of their operation. Briefly, however, it may be stated that when air conditioning is to be provided, the manual switches 120 and 121 are closed to start the motor 14 and fan 13. The switch 122, which is similar to switch 30, controls the refrigeration demands of the apparatus automatically in response to conditions within or outside of the car as desired. The centrifugal switches 101 and 102 control changes of the system in response to car speed. During the first car speed zone, the switch arm 123 is in the position diagrammatically represented to the left, so that the switches 124 and 125 are closed and the switches 126 and 127 are open. The switch 128 is automatically closed when the source of outside electrical current is not available as hereinafter more fully explained. Therefore battery current can flow through the switches 122, 128 and 124 to the solenoid 129 to close switch 130, with a time delay, and energize the solenoid 131. This in turn closes the starter 132, with time delay device 133, to start the motor-generator 105 as a motor. The motor field 134 is also energized from the battery since the switch 135 is closed during the first car speed zone. The motor-generator 105, as a motor, drives the compressor whenever refrigeration is required, since the clutches 108 and 109 are automatically declutched and clutched, respectively, by the proper energization of the solenoid valves 110 and 111 which control the flow of air to the clutches in the manner similarly described with respect to Fig. 2. The valve 111 is energized throughout the first car speed zone through closed switches 125 and 125a slightly before time that the motor-generator can be energized as a motor. The valve 110 is unenergized throughout the first car speed zone because the switch 127 is open.

During the second car speed zone, the live axle assembly 100 drives the motor-generator at all times, and the compressor whenever refrigeration conditions require it. This is accomplished by calibrating the centrifugal switches 101 and 102 so that the switch 101 throws its arm 123 to the right at 15 M. P. H., but the switch 102 does not throw its arm 140 to the right until the car reaches the third car speed zone such as 30 M. P. H. Thus during the second car speed zone the arm 123 is to the right and the arm 140 is to the left so that the switches 124, 125, 141 and 142 are open and the switches 126, 127 and 135 are closed. The opening of the switch 124 prevents the motor-generator 105 from being energized as a motor from the battery. The opening of the switch 125 prevents the valve 111 from being permanently energized and places the valve 111 under the control of the switch 122 so that the clutch 109 is clutched only when refrigeration is required and is declutched when refrigeration is not required.

The clutch 108 is permanently clutched during the second car speed zone by the closing of the switch 127. A time delay is introduced in the closing of clutch 108 in order to prevent a sudden reversal of rotating parts which might otherwise happen if the motor-generator had previously been driving the compressor during the first car speed zone in a direction opposite to that which the live axle assembly would drive it. This is accomplished by the thermostatic time delay device 143 which closes the switch 144 with a time delay. The switch 145 is closed when outside electrical current is not available and hence the pneumatic valve 110 is energized to close the clutch 108. At the same time the solenoid 146 closes the switch 147, with time delay, to place the valve 111, and its clutch 109 under the control of the thermostatic switch 122.

During the third car speed zone, the centrifugal switch 102 moves its arm 140 to the right thus opening the switch 135 and closing the switches 141 and 142 by the action of solenoid 102a on arm 140a, the solenoid 102a being energized by the closing of switch 140b. This changes the energization of the motor-generator field 134 from battery energization to energization from the exciter 104 through the switch 141. At the same time the field 148 of the exciter is placed under the control of the voltage and current regulating device 149 to control the current and connection between the motor-generator and the battery.

The foregoing operations are more fully described in our copending application and reference is made thereto for a more detailed disclosure thereof, if necessary.

*Operation of system of Figs. 5 and 6 when outside electrical energy is available*

When outside electrical energy is available, such as from wire 53 and wheel 56, the same may be connected to the system by means of connector 54 which energizes the primary coil of transformer 150. The secondary coil of the transformer 150 energizes the solenoid 151 to open switches 128, 125a and 145 and to close switches 153, 154 and 145, and is in readiness to supply current to the additional motor 106. Manual or automatic switch 152 is provided for connecting the motor 106 with the source of outside electrical energy, it being understood that switch 152 may be made automatically responsive to such connection by causing it to be automatically closed by magnetic force upon the energization of solenoid 151. The energization of solenoid 151 opens switch 128 thus preventing the motor-generator 105 from being energized as a motor. Solenoid 151 also opens switch 125a and closes switch 153. This places valve 111, and its clutch 109 under the control of thermostatic switch 122, thus causing the motor 106 to drive the compressor 107 whenever refrigeration is required, and to be declutched therefrom when refrigeration is not required. Solenoid 151 also opens switch 145 thus permanently deenergizing valve 110 and declutching clutch 108. Under these conditions the motor 106 drives the motor-generator 105 and its exciter 104 at all times that the source of outside electrical energy is connected to the system. The solenoid 151 also closes switch 154 and thus permanently connects the armature of the exciter 104 with the field 134 so that the motor-generator 105 can act as a generator as long as the outside electrical energy drives the motor 106.

It is understood that, wherever it is consistent, the description of one part in one view is intended also to describe the operation of a similar part in another view, and that parts corresponding to those shown in our copending application are intended to operate as described in our copending application, being modified only as necessary for operation with outside electrical energy.

While the form of embodiment of the invention as herein disclosed, constitutes a preferred form, it is to be understood that other forms might be adopted, all coming within the scope of the claims which follow.

What is claimed is as follows:

1. In a vehicle; a live axle assembly; a compressor; a unitary motor-generator; a battery; torque transmitting means from said live axle assembly to said compressor and motor-generator and between said compressor and motor-generator; control means, automatically responsive to vehicle running conditions, to cause said motor-generator, to act as a motor energized from said battery, to drive said compressor independently of said live axle assembly when said vehicle is standing and, when said vehicle is in motion, to cause said live axle assembly to drive, through said torque transmitting means, said compressor and said motor-generator, said motor-generator arranged to act as a generator to charge said battery, a source of outside electrical current, a current-changing device connectable to said source of outside electrical current, connecting means for connecting said source to said current-changing device and for connecting said current-changing device to said battery and motor-generator, and means for modifying said control means when said current-changing device is operating to cause said motor-generator to act as a motor to drive said compressor when said car is in motion.

2. In a vehicle; a live axle assembly; a compressor; a unitary motor-generator; a battery; torque transmitting means from said live axle assembly to said compressor and motor-generator and between said compressor and motor-generator; control means, automatically responsive to vehicle running conditions, to cause said motor-generator, to act as a motor energized from said battery, to drive said compressor independently of said live axle assembly when said vehicle is standing, and, when said vehicle is in motion, to cause said live axle assembly to drive, through said torque transmitting means, said compressor and said motor-generator, said motor-generator arranged to act as a generator to charge said battery, a source of outside electrical current, a motor to be energized from said source, and means for disconnecting said motor-generator from said compressor and connecting said motor to said compressor when said motor is energized from said source.

3. In a vehicle; a live axle assembly; a compressor; a unitary motor-generator; a battery; torque transmitting means from said live axle assembly to said compressor and motor-generator and between said compressor and motor-generator; control means, automatically responsive to vehicle running and refrigeration conditions, to cause said motor-generator, to act as a motor energized from said battery, to drive said compressor independently of said live axle assembly when said vehicle is standing and, when said vehicle is in motion, to cause said live axle assembly to drive, through said torque transmitting means, said compressor and said motor-generator, said motor-generator arranged to act as a generator to charge said battery, a source of outside electrical current, a motor to be energized from said source, and means for connecting said motor to said motor-generator and disconnecting said motor-generator from said live axle assembly and connecting said motor to said compressor when said motor is energized from said source.

4. In a vehicle; a live axle assembly; a compressor; a unitary motor-generator; a battery; torque transmitting means from said live axle assembly to said compressor and motor-generator; and between said compressor and motor-generator; control means, automatically responsive to vehicle running conditions, to cause said motor-generator, to act as a motor energized from said battery, to drive said compressor independently of said live axle assembly when said vehicle is standing and, when said vehicle is in motion, to cause said live axle assembly to drive, through said torque transmitting means, said compressor and said motor-generator, said motor-generator arranged as a generator to charge said battery, a source of outside electrical energy, a motor, means for energizing said motor from said source and said compressor from said motor, and means automatically to modify the operation of said torque transmitting means when said source is connected to said motor.

5. In a vehicle; a live axle assembly, a compressor; a unitary motor-generator; a battery; torque transmitting means from said live axle assembly to said compressor and motor-generator and between said compressor and motor-generator; control means, automatically responsive to vehicle running conditions, to cause said motor-generator, to act as a motor energized from said battery, to drive said compressor independently of said live axle assembly when said vehicle is running below a certain speed limit, and when said vehicle is running above a certain speed limit, to cause said live axle assembly to drive, through said torque transmitting means, said compressor and said motor-generator, said motor-generator arranged to act as a generator to charge said battery, a source of outside electrical energy, a motor, means for energizing said motor from said source, and additional control means responsive to the connection of said source of outside electrical energy to said motor to prevent said live axle assembly from driving said compressor, and to cause said motor to furnish power to drive said compressor in response to refrigeration conditions at all car speeds.

6. In a vehicle; a live axle assembly, a compressor; a unitary motor-generator; a battery; torque transmitting means from said live axle assembly to said compressor and motor-generator and between said compressor and motor-generator; control means, automatically responsive to vehicle running and refrigeration conditions, to cause said motor-generator, to act as a motor energized from said battery, to drive said compressor independently of said live axle assembly when said vehicle is running below a certain speed limit and, when said vehicle is running above a certain speed limit, to cause said live axle assembly to drive, through said torque transmitting means, said compressor and said motor-generator, said motor-generator arranged to act as a generator to charge said battery, a source of outside electrical energy, a motor, means for energizing said motor from said source, a generator driven by said motor, and additional control means automatically responsive to the connection of said source to said motor to prevent said live axle assembly from driving said compressor, to connect said generator to said battery and motor-generator, and to cause said motor-generator as a motor, to drive said compressor in response to refrigeration conditions.

7. In a vehicle; a live axle assembly, a compressor; a unitary motor-generator; a battery; torque transmitting means from said live axle assembly to said compressor and motor-generator and between said compressor and motor-generator; control means, automatically responsive to vehicle running and refrigeration conditions, to cause said motor-generator, to act as a motor energized from said battery, to drive said compressor independently of said live axle assembly when said vehicle is running below a certain speed limit and, when said vehicle is running above a certain speed limit, to cause said live axle assembly to drive, through said torque transmitting means, said compressor and said motor-generator, said motor-generator arranged to act as a generator to charge said battery, a source of outside electrical energy, a motor, means for energizing said motor from said source, and additional control means responsive to the connection of said source to said motor to prevent said live axle assembly from driving said compressor, and to cause said motor to drive said compressor in response to refrigeration conditions at all car speeds.

8. In a vehicle; a live axle assembly, a compressor; a unitary motor-generator; a battery; torque transmitting means from said live axle assembly to said compressor and motor-generator and between said compressor and motor-generator; control means, automatically responsive to vehicle running and refrigeration conditions, to cause said motor-generator, to act as a motor energized from said battery, to drive said compressor independently of said live axle assembly when said vehicle is running below a certain speed limit and, when said vehicle is running above a certain speed limit, to cause said live axle assembly to drive, through said torque transmitting means, said compressor and said motor-generator, said motor-generator arranged to act as a generator to charge said battery, a source of outside electrical energy, a motor, means for energizing said motor from said source, and additional control means responsive to the connection of said source to said motor to prevent said live axle assembly from driving said compressor and motor-generator and to cause said motor to drive said compressor in response to refrigeration conditions at all car speeds and to drive said motor-generator as a generator.

9. In a vehicle; a live axle assembly, a compressor; a unitary motor-generator; a battery; torque transmitting means from said live axle assembly to said compressor and motor-generator and between said compressor and motor-generator; control means, automatically responsive to vehicle running and refrigeration conditions, to cause said motor-generator, to act as a motor energized from said battery, to drive said compressor independently of said live axle assembly when said vehicle is running below a certain speed limit and, when said vehicle is running above a certain speed limit, to cause said live axle assembly to drive, through said torque transmitting means, said compressor and said motor-generator, said motor-generator arranged to act as a generator to charge said battery, a source of outside electrical energy, connecting means between said vehicle and said source and including additional automatic controls to cause said source automatically to charge said battery and to drive said compressor in response to refrigeration conditions.

10. In a vehicle; a live axle structure; a battery; a refrigerating system on said vehicle including an evaporator, condenser and a unitary motor-generator; a compressor; torque transmitting means from said live axle structure to said motor-generator and said compressor, and between said compressor and motor-generator; first clutch means between said live axle structure and said motor-generator and compressor; second clutch means between said motor-generator and compressor; speed responsive means to cause said first clutch means to disengage below a certain speed limit, refrigeration responsive means controlling the engagement of said second clutch means, and provisions for automatically changing said motor-generator between motoring from said battery and charging said battery in response to running and refrigeration conditions, a source of outside electrical energy, connecting means between said vehicle and said source and including additional provisions to cause said source automatically to charge said battery and to drive said compressor in response to refrigeration conditions.

11. In a vehicle; a live axle assembly, a compressor; a unitary motor-generator; a battery; torque transmitting means from said live axle assembly to said compressor and motor-generator and between said compressor and motor-generator; control means, automatically responsive to vehicle running and refrigeration conditions, to cause said motor-generator, to act as a motor energized from said battery, to drive said compressor independently of said live axle assembly when said vehicle is running below a certain speed limit and, when said vehicle is running above a certain speed limit, to cause said live axle assembly to drive, through said torque transmitting means, said compressor and said motor-generator, said motor-generator arranged to act as a generator to charge said battery, a source of outside electrical energy, connecting means between said vehicle and said source and including additional automatic controls to cause said source automatically to drive said compressor in response to refrigeration conditions.

12. In a vehicle; a live axle structure; a battery; a refrigerating system on said vehicle including an evaporator, condenser and a unitary motor-generator; a compressor; torque transmitting means from said live axle structure to said motor-generator and said compressor, and between said compressor and motor-generator; first clutch means between said live axle structure and said motor-generator and compressor; second clutch means between said motor-generator and compressor; speed responsive means to cause said first clutch means to disengage below a certain speed limit, refrigeration responsive means controlling the engagement of said second clutch means, provisions for automatically changing said motor-generator between motoring from said battery and charging said battery in response to running and refrigeration conditions, a source of outside electrical energy, connecting means between said vehicle and said source and including additional provisions to cause said source automatically to drive said compressor in response to refrigeration conditions.

13. In a vehicle; a live axle structure; a battery; a refrigerating system on said vehicle including an evaporator, condenser and a unitary motor-generator; a compressor; torque transmitting means from said live axle structure to said motor-generator and said compressor, and between said compressor and motor-generator; first clutch means between said live axle structure and said motor-generator and compressor; second clutch means between said motor-generator and compressor; speed responsive means to cause said first clutch means to disengage below a certain speed limit, refrigeration responsive means controlling the engagement of said second clutch means, provisions for automatically changing said motor-generator between motoring from said battery and charging said battery in response to running and refrigeration conditions, a source of outside electrical energy, connecting means between said vehicle and said source and including additional provisions to cause said source automatically to disengage said first clutch means, to charge said battery and to drive said compressor.

14. In a vehicle; a live axis assembly, a compressor; a unitary motor-generator; a battery; torque transmitting means from said live axle assembly to said compressor and motor-generator and between said compressor and motor-generator; control means, automatically responsive to vehicle running and refrigeration conditions, to cause said motor-generator to act as a motor energized from said battery, to drive said compressor independently of said live axle assembly when said vehicle is running below a certain speed limit and, when said vehicle is running above a certain speed limit, to cause said live axle assembly to drive, through said torque transmitting means, said compressor and said motor-generator, said motor-generator arranged to act as a generator to charge said battery, a source of outside electrical energy, connecting means between said vehicle and said source, and including provisions for charging said battery from said source.

15. A car having a compartment to be conditioned; a refrigerating system on said car including a compressor, condenser and evaporator in refrigerant flow relationship; D. C. wiring on said car forming D. C. circuit-connections; a blower and a D. C. blower motor on said car for circulating air in thermal exchange with said evaporator and in said compartment, to deliver air conditioned by said evaporator to said compartment; a battery on said car connected to said D. C. wiring; two D. C. dynamo electric machines on said car, one of which is drivingly connected to said compressor at least when compressor operation is required and both of which are connectible to said battery by said D. C. wiring; an A. C. motor on said car connected to one of said D. C. dynamo electric machines at least when said A. C. motor operates; air condition control means responsive to a psychrometric function of air causing intermittent operation of said compressor by one of said D. C. dynamo electric machines in accordance with said function; a blower switch for connecting said D. C. blower motor with said D. C. wiring while said compressor operates and at other times; an A. C. source outside said car; an A. C. connector for connecting said A. C. source to said A. C. motor, said A. C. motor continuously driving one of said D. C. dynamo electric machines as a D. C. generator when said A. C. connector is connected to said A. C. source independently of the intermittent operation of said compressor; a cutout between said battery D. C. wiring and the said D. C. dynamo electric machine driven by said A. C. motor closing while proper generation speed is attained, said last named D. C. dynamo electric machine charging said battery and energizing said D. C. blower motor independently of the intermittent operation of said compressor, said compressor deriving power for intermittent operation from continuous operation of said A. C. motor when said A. C. motor is connected to said A. C. source.

16. A car having a compartment to be conditioned; a refrigerating system on said car including a compressor, condenser and evaporator in refrigerant flow relationship; D. C. wiring on said car forming D. C. circuit-connections; a blower and a D. C. blower motor on said car for circulating air in thermal exchange with said evaporator and in said compartment, to deliver air conditioned by said evaporator to said compartment, a battery on said car connected to said D. C. wiring, two D. C. dynamo electric machines on said car, one of which is drivingly connected to said compressor at least when compressor operation is required and both of which are connectible to said battery by said D. C. wiring; an A. C. motor on said car connected to one of said D. C. dynamo electric machines at least when said A. C. motor operates; air condition control means responsive to a psychrometric function of air causing intermittent operation of said compressor by one of said D. C. dynamo electric machines in accordance with said function; a blower switch for connnecting said D. C. blower motor with said D. C. wiring while said compressor operates and at other times; an A. C. source outside said car; an A. C. connector for connecting said A. C. source to said A. C. motor, said A. C. motor continuously driving one of said D. C. dynamo electric machines as a D. C. generator when said A. C. connector is connected to said A. C. source independently of the intermittent operation of said compressor; a cutout between said battery D. C. wiring and the said D. C. dynamo electric machine driven by said A. C. motor closing while proper generation speed is attained, said last named D. C. dynamo electric machine charging said battery and energizing said D. C. blower motor independently of the intermittent operation of said compressor, said compressor being intermittently driven by the said D. C. dynamo electric machine not connected to said A. C. motor, but deriving its power for intermittent operation from the continuous operation of said A. C. motor and the D. C. dynamo electric machine connected to said A. C. motor when said A. C. motor is connected to said A. C. source.

17. In a vehicle; a compressor; a motor; a battery; torque transmitting means between said compressor and motor; control means, responsive to refrigeration conditions, to cause said motor to energize from said battery, to drive said compressor when said vehicle is standing and at least part of the time when said vehicle is in motion, a source of outside electrical current, a current-changing device on said vehicle, means for connecting said current changing device to said outside source of current while said vehicle is in motion, and connecting means for connecting said source to said current-changing device and for connecting said current-changing device to said battery and motor.

18. In a vehicle; a live axle assembly; a compressor; a motor; a battery; torque transmitting means between said compressor and motor; control means, responsive to refrigeration conditions, to cause said motor to be energized from said battery, to drive said compressor independently of said live axle assembly when the vehicle is running below a certain speed limit and, when the vehicle is running above a certain speed limit, to cause said live axle assembly to supply power for operating said motor and compressor, a source of outside electrical energy, means on said vehicle for utilizing said energy in operating said motor while said vehicle is in motion, and means whereby said control means stops said motor whenever refrigeration is no longer required.

19. In a vehicle, air conditioning apparatus comprising a compressor, a condenser, an evaporator in refrigerant flow relationship, a battery, a direct-current motor for driving said compressor from said battery, an alternating-current direct-current machine on said vehicle, an outside source of alternating current, means for connecting said alternating-current source and said alternating-current direct-current machine while said vehicle is in motion, and means for connecting said alternating-current direct-current machine to said battery and motor when said alternating current is being supplied.

20. In a vehicle, a compressor, a motor, a battery, torque transmitting means between said motor and said compressor, temperature responsive means to cause said motor to energize from said battery, to drive said compressor when said vehicle is standing and at least part of the time when said vehicle is in motion, a source of outside electrical current, a current-changing device on said vehicle connectible to said source of outside electrical current, and connecting means for connecting said source to said current-changing device while said vehicle is in motion and for connecting said current-changing device to said battery and to said motor.

21. In a vehicle, a live axle assembly, a compressor, a motor, a battery, power transmitting means between said live axle assembly and said motor and between said motor and said compressor, means for energizing said motor from said battery so as to operate said compressor, a source of outside electrical energy, a current-changing device on said vehicle connectible to said source of outside electrical current while said vehicle is in motion, means for connecting said current-changing device to said battery and to said motor, and means responsive to refrigeration conditions controlling the energization of said motor.

22. In a vehicle, air conditioning apparatus comprising a compressor, a condenser, an evaporator in refrigerant flow relationship, a battery, a direct-current motor for driving said compressor from said battery, an alternating-current direct-current machine on said vehicle, an outside source of alternating current, means for connecting said alternating-current source and said alternating-current direct-current machine while said vehicle is in motion, means for automatically connecting said alternating-current direct-current machine to said battery when said alternating current is being supplied, and means responsive to refrigeration conditions controlling the operation of said motor.

23. In a vehicle; a live axle assembly; a compressor; a motor; a battery; torque transmitting means between said compressor and motor; control means, responsive to refrigeration conditions, to cause said motor to be energized from said battery, to drive said compressor independently of said live axle assembly when the vehicle is running below a certain speed limit and, when the vehicle is running above a certain speed limit, to cause said live axle assembly to supply power for operating said motor and compressor; a source of outside electrical energy; means on said vehicle for utilizing said energy in operating said motor; means whereby said control means stops said motor whenever refrigeration is no longer required; and means for rendering said live axle assembly inoperative for operating said compressor in response to energization from said outside source of electrical energy.

24. In a vehicle, a live axle assembly, a compressor, a motor, a battery, power transmitting means between said live axle assembly and said motor and between said motor and said compressor, means for energizing said motor from said battery so as to operate said compressor, a source of outside electrical energy, a current-changing device on said vehicle connectible to said source of outside electrical current, means for connecting said current-changing device to said battery and to said motor, means responsive to refrigeration conditions controlling the energization of said motor, and means responsive to energization from said source of outside electrical energy for disconnecting said live axle assembly from said compressor.

25. In a railway vehicle adapted to be used on a line on which outside electrical energy is available a portion of the time when said vehicle is in motion, a live axle assembly, a compressor, torque transmitting means between said assembly and said compressor, means utilizing energy from said outside source of electrical energy for operating said compressor while said vehicle is in motion and said electrical energy is available, and means rendering said torque transmitting means inoperative in response to energy being supplied from said outside source.

26. In a passenger car or the like, a live axle assembly, a compressor, torque transmitting means between said assembly and said compressor, means for supplying electrical energy to said car from a source outside said car at least a portion of the time when said car is in motion, dynamo-electric mechanism utilizing energy from said outside source for operating said compressor, and means rendering said torque transmitting means inoperative in response to energization of said dynamo-electric mechanism from said outside source of electrical energy.

27. In a vehicle; a live axle assembly; a generator; refrigerating apparatus for conditioning the air in said vehicle comprising a compressor; power transmitting means between said live axle assembly and said generator; mechanism for drivingly connecting said compressor to said live axle assembly; a stand-by motor drivingly connected to said generator; clutch means for disengaging said generator from said live axle drive; and means for supplying energy for conditioning the air in said vehicle at such times when neither the live axle assembly nor the stand-by motor are supplying energy for conditioning the air in the vehicle.

28. A car having a compartment to be conditioned; a refrigerating system on said car including a compressor, condenser and evaporator in refrigerant flow relationship; direct-current wiring on said car forming direct-current circuit-connections, a blower and a blower motor on said car for circulating air in thermal exchange with said evaporator and in said compartment, to deliver air conditioned by said evaporator to said compartment; a battery on said car connected to said direct-current wiring; two direct-current dynamo-electric machines on said car, one of which is drivingly connected to said compressor at least when compressor operation is required and both of which are connectible to said battery by said direct-current wiring; an alternating-current motor on said car connected to one of said direct-current dynamo-electric machines at least when said alternating-current motor operates; air condition control means responsive to a psychrometric function of air causing intermittent operation of said compressor by one of said direct-current dynamo-electric machines in accordance with said function; an alternating-current source outside said car; an alternating-current connector for connecting said alternating-current source to said alternating-current motor, said alternating-current motor continuously driving one of said direct-current dynamo-electric machines as a direct-current generator when said alternating-current connector is connected to said alternating-current source independently of the intermittent operation of said compressor; a cutout between said battery direct-current wiring and the said direct-current dynamo-electric machine driven by said alternating-current motor closing while proper generation speed is attained, said last named direct-current dynamo-electric machine charging said battery independently of the intermittent operation of said compressor, said compressor deriving power for intermittent operation from continuous operation of said alternating-current motor when said alternating-current motor is connected to said alternating-current source.

29. A car having a compartment to be conditioned; a refrigerating system on said car including a compressor, condenser and evaporator in refrigerant flow relationship; direct-current wiring on said car forming direct-current circuit-connections; a blower and a blower motor on said car for circulating air in thermal exchange with said evaporator and in said compartment, to deliver air conditioned by said evaporator to said compartment, a battery on said car connected to said direct-current wiring, two direct-current dynamo-electric machines on said car, one of which is drivingly connected to said compressor at least when compressor operation is required and both of which are connectible to said battery by said direct-current wiring; an alternating-current motor on said car connected to one of said direct-current dynamo-electric machines at least when said alternating-current motor operates; air condition control means responsive to a psychrometric function of air causing intermittent operation of said compressor by one of said direct-current dynamo-electric machines in accordance with said function; an alternating-current source outside said car; an alternating-current connector for connecting said alternating-current source to said alternating-current motor, said alternating-current motor continuously driving one of said direct-current dynamo-electric machines as a direct-current generator when said alternating-current connector is connected to said alternating-current source independently of the intermittent operation of said compressor; a cutout between said battery direct-current wiring and the said direct-current dynamo-electric machine driven by said alternating-current motor closing while proper generation speed is attained, said last named direct-current dynamo-electric machine charging said battery independently of the intermittent operation of said compressor, said compressor being intermittently driven by the said direct-current dynamo-electric machine not connected to said alternating-current motor, but deriving its power for intermittent operation from the continuous operation of said alternating-current motor and the direct-current dynamo-electric machine connected to said alternating-current motor when said alternating-current motor is connected to said alternating-current source.

30. Air conditioning apparatus for use on a vehicle comprising in combination, a compressor, a motor, torque transmitting means between said compressor and said motor, a battery, temperature responsive means to cause said motor to drive said compressor both when the vehicle is standing and when said vehicle is in motion, mechanism on said vehicle for supplying electrical energy for charging said battery and for supplying electrical energy for operating said motor, said mechanism comprising an alternating-current dynamo-electric machine, a direct-current dynamo-electric machine, torque transmitting means between said alternating-current dynamo-electric machine and said direct-current dynamo-electric machine, and circuit connections between said direct-current dynamo-electric machine and said battery whereby operation of said direct-current dynamo-electric machine supplies energy for charging said battery.

DONALD F. ALEXANDER.
CHARLES F. HENNEY.
CHARLES L. PAULUS.